R. E. HIGBEE.
DEVICE FOR USE IN WIPING PIPE JOINTS.
APPLICATION FILED JAN. 22, 1914.

1,157,391.

Patented Oct. 19, 1915.

WITNESSES:

INVENTOR
Roy E. Higbee,
BY
ATTORNEYS

UNITED STATES PATENT OFFICE.

ROY E. HIGBEE, OF WINDSOR, MISSOURI.

DEVICE FOR USE IN WIPING PIPE-JOINTS.

1,157,391.  Specification of Letters Patent.  Patented Oct. 19, 1915.

Application filed January 22, 1914. Serial No. 813,790.

*To all whom it may concern:*

Be it known that I, ROY E. HIGBEE, a citizen of the United States, and a resident of Windsor, in the county of Henry and State of Missouri, have made an Improved Device for use in Wiping Pipe-Joints, of which the following is a specification.

My invention is an improved device for holding a nipple or ferrule in due position on the end of a lead pipe while the joint is being wiped.

The details of construction, arrangement, and operation of the device are as hereinafter described and illustrated in the accompanying drawing, in which—

Figure 1:
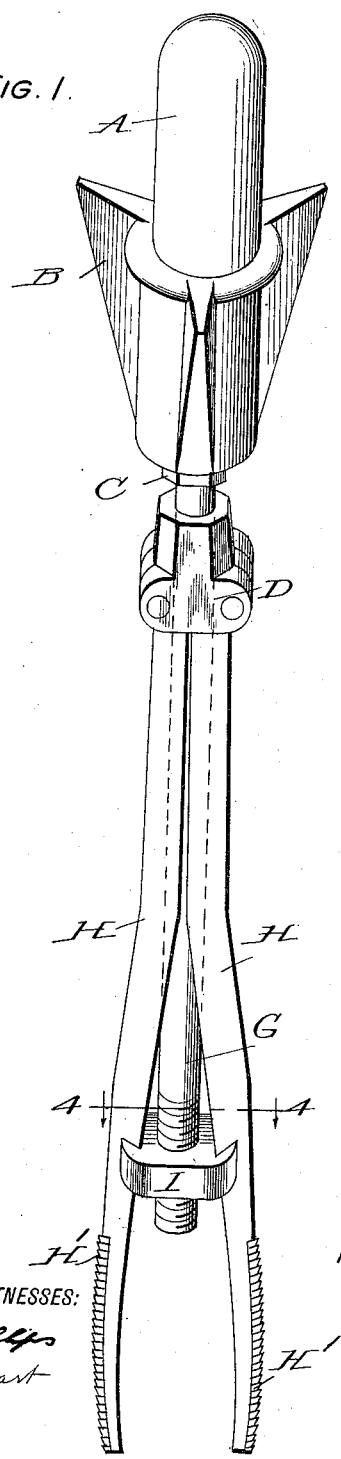
Figure 2:
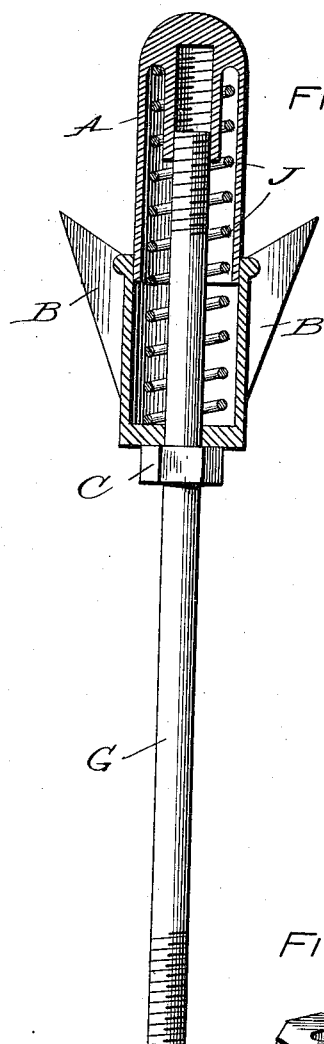
Figure 3:
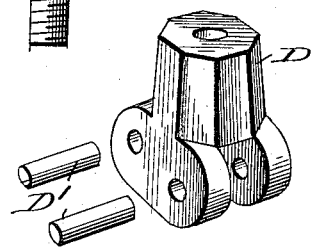
Figure 4:
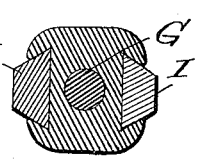

Figure 1 is a perspective view of the complete device. Fig. 2 is a longitudinal section of a portion of the same. Fig. 3 is a perspective view of a block or so-called head adapted to slide on a rod which forms a prominent member of the device. Fig. 4 is a horizontal section on the line 4—4 of Fig. 1.

A indicates a sleeve whose closed outer end is conical, and it is provided interiorly with a threaded socket into which a rod G is screwed. The lower end of said rod is also screw-threaded for engagement with a nut I, which is provided with lateral dovetail notches to engage jaws H. The upper ends of the jaws are pivoted on pins D' in the ears of a block D, hereinafter termed the head, which is adapted to slide on the rod G. The lower portions of the jaws H are incurved slightly to better adapt them for insertion in the lead pipe, and they are toothed externally, as indicated at H'. A nipple-engaging device B is mounted on the upper portion of the rod G, above a polygonal stop collar C, and the same comprises a cylinder having a solid bottom and open at its upper end and provided with lateral flanges or wings which are of triangular shape, their widest ends being upward so that the device is in effect conical and thus adapted to enter the mouths of nipples of different diameters.

The sleeve A before referred to is slidable in the cylindrical body of the device B. A spiral spring surrounds the rod within the sleeve and member B, and its ends bear against the outer ends of the ferrule A and nipple member B, thus pressing them in opposite directions.

The manner of using the device will now be understood. It being assumed that a soldering nipple or ferrule has been applied to the end of a lead pipe, the jaws H are dropped into the nipple and pipe until the flanges of the member B enter the mouth of the nipple and bear laterally against the upper portion of the same. It is apparent that the shape of the flanges or wings of this device will cause it to slide down to place in nipples of different diameters. The toothed portions H' of the jaws H, upon sliding down on the spreading device I, will be forced outward into engagement with the interior of the pipe, and upon rotating the sleeve A the rod G will be acted upon in such manner as to spread the jaws more or less so as to grip the pipe firmly at the same time that the conical member B is drawn down upon the nipple to a corresponding degree. It is apparent that by pressing on the sleeve A more or less, the spring I will be compressed correspondingly, and the flanged nipple-holding device I will therefore press on the nipple and hold it firmly in place while solder is being applied to the joint. To release the device after the joint has been wiped, it and the pipe in which it is inserted are turned up side down and the sleeve A is pressed on the floor, thus again compressing the spring J, which pushes rod G upward and carries the spreading nut I with it, thereby removing the teeth H' of the jaws H from their hold on the lead pipe, whereupon the weight of the jaws and the head D will cause them to slide down on the rod G until the head D comes in contact with the stop collar of the rod G, so that the entire device falls out free of the lead pipe and the nipple.

What I claim is:

1. The improved device for the purpose specified, comprising a member adapted to bear upon the sliding nipple; a screw rod; a stop collar on said rod and an adjustable sleeve screwed on the upper end of the rod; a spring bearing in opposite directions against said member and sleeve; jaws pivotally connected and slidable on the said rod, the same being adapted to enter the pipe and grip the same internally; and a spreader applied to the lower portions of said jaws, as described.

2. The improved device comprising a conical member adapted to enter and bear upon a nipple; a screw rod having a stop collar and on which said member is adapted to slide; an adjustable sleeve screwed on the rod, and thus adapted for longitudinal adjustment thereon; a spring acting on the said member and sleeve in opposite directions; jaws which are slidable on the rod and adapted to be inserted in a pipe and to grip the same interiorly; and a device applied to the lower portion of the rod and serving to spread the jaws more or less according to its adjustment, as described.

3. In a device for the purpose specified, the combination, with jaws for gripping a lead pipe interiorly, of a rod provided with a stop collar, and on which said jaws are slidably adjustable; a conical member which is slidable on the upper portion of the rod above the stop collar and having lateral triangular flanges whose wider ends are uppermost, to adapt it to fit nipples of different diameters; a sleeve which is slidable on said member and closed at its outer end, and screwed upon the aforesaid rod; and a spring interposed between such sleeve and the flanged member; as described.

In testimony whereof I have signed my name to this specification in the presence of two subscribing witnesses.

ROY E. HIGBEE.

Witnesses:
ABRAM L. DUFF,
FRED C. LIVINGSTON.